Patented Dec. 17, 1940

2,224,888

UNITED STATES PATENT OFFICE 2,224,888

MAKING ALUMINUM SULPHATE

John H. Walthall, near Sheffield, Ala.

No Drawing. Application March 16, 1938,
Serial No. 196,160

10 Claims. (Cl. 23—123)

(Granted under the act of March 3, 1883, as
amended April 30, 1928; 370 O. G. 757)

The invention herein described may be manufactured and used by or for the Government for governmental purposes without the payment to me of any royalty thereon.

This invention relates to the art of producing aluminum sulphate, particularly from natural aluminum-containing materials.

One of the objects of this invention is to provide a method for the production of aluminum sulphate from natural clays, which are essentially aluminum silicates. Another object of this invention is to provide a method for the production of aluminum sulphate from low grade bauxite ore which is ordinarily unsuitable as a raw material for the production of aluminum and its compounds. Still another object of this invention is to provide a method for the simultaneous production of not only aluminum sulphate but an alkali metal sulphate from aluminum-containing materials containing both elements. A further object of this invention is to provide a method for the production of aluminum sulphate in which the conditions are such that a low acidity is maintained and the necessity of providing extremely corrosion-resisting materials of construction is reduced to a minimum. Other objects of this invention include the provision of an efficient and economical method for the production of aluminum sulphate by the use of by-product sulphur dioxide under conditions conducive to the most effective utilization of such sulphur dioxide.

I have discovered a process of making aluminum sulphate from an aluminum-containing material, which is ordinarily considered reactive with dilute sulphuric acid to form aluminum sulphate, by making an aqueous suspension of the finely divided aluminum-containing material in water containing a catalyst of such character and in such amount as is ordinarily considered suitable for the formation of sulphuric acid from sulphur dioxide, oxygen, and water, and by passing a stream of gas containing sulphur dioxide and air in intimate contact with the aqueous suspension of the finely divided material until a substantial proportion of the aluminum originally contained in the material has been converted into aluminum sulphate.

One example of the operation of my process is given for the production of aluminum sulphate from a clay, which was essentially aluminum silicates. An aqueous solution of manganese sulphate, containing 0.03 parts by weight of manganese and suitable for the direct production of sulphuric acid from sulphur dioxide, oxygen, and water was prepared. The clay was heated to 600° C. for one hour. After cooling, the heated clay was reduced to a fineness such that approximately 50 per cent passed through a 100 mesh screen. Twenty-five parts of the finely divided clay so prepared were suspended in 100 parts of the water containing the manganese sulphate catalyst and a stream of gas containing 16.1% by volume of $SO_2$ and 17.5% by volume of $O_2$ was passed in intimate contact with the aqueous suspension of the clay for a length of time sufficient to convert a substantial proportion of the aluminum in the clay to aluminum sulphate. After filtering to remove the solid and undissolved impurities, it contained 9.8 grams of $Al_2O_3$ per 100 cc. of solution, which is equivalent to 33.3 grams of aluminum sulphate per 100 cc. of solution, and approximately 25.5% by weight of aluminum sulphate. The resulting solution was slightly basic in the sense that it contained a slightly higher percentage of aluminum than that which corresponded to normal aluminum sulphate.

It is evident that there are numerous factors which will influence conditions for the most satisfactory operation of my invention, the actual limits of which cannot be established except by a detailed study of each set of raw materials and intermediate and finished products involved.

The aluminum-containing material used may be any such material which may be commonly characterized as being substantially soluble in dilute sulphuric acid. The very abundant and naturally occurring clays, which are essentially aluminum silicates, are characteristic of suitable raw material for use in my process. Other suitable materials include minerals generally recognized as potential sources of aluminum and its compounds, or include bauxite, leucite, greensand, feldspars, or alunite. Such materials may be used directly in my process, but it is ordinarily preferred to heat such materials to a substantial superatmospheric temperature in the order of 600 to 900° C. since this treatment generally increases the solubility of the aluminum content of such materials. Aluminum-containing materials containing a high percentage of silica, either in combination with the aluminum or otherwise, are suitable for use in my process, whereas for most other wet processes for the extraction of aluminum from natural raw materials the presence of any appreciable quantity of silica is particularly disadvantageous.

The aluminum-containing material which is used is preferably reduced to a fine state of subdivision in order that a more uniform aqueous suspension of the material may be produced and thereby increase the rate of the subsequent reaction carried out therein. In the course of handling the aluminum-containing material, a part of it will ordinarily be reduced to a rather fine state of subdivision, but the remainder need not necessarily be so prepared. In any event, the fineness of the material should ordinarily be such that a reasonably satisfactory aqueous suspension can be produced.

An amount of catalyst of such a character as is usually considered suitable for the production of sulphuric acid from sulphur dioxide, oxygen, and water is included in the water either before or after the formation of the aqueous suspension of the aluminum-containing material. A manganese catalyst, such as manganese sulphate, in an amount in the order of 0.1 to 0.01 per cent, is generally known as being suitable for this purpose. Many other catalytic agents have been proposed and some have been found which are also reasonably suitable for such conversion. While manganese sulphate is preferred, any catalyst suitable for this purpose may be used.

The sulphur dioxide used is contained in a gaseous mixture derived from any suitable source. Byproduct gases will ordinarily contain up to 10 per cent by volume of sulphur dioxide. However, gaseous mixtures containing up to approximately 65% of sulphur dioxide may be used. The gas used in my process must contain oxygen in a volume concentration equal to at least one half of that of the sulphur dioxide for efficient utilization of the sulphur dioxide.

The gaseous mixture containing sulphur dioxide and oxygen is passed in intimate contact with the aqueous suspension of the finely divided aluminum-containing material in the presence of a catalyst as before mentioned in any suitable manner. This gas may be distributed through the aqueous suspension using a discontinuous operation, or using a plurality of discontinuous operations, but it is preferable to carry out the operation in a continuous manner with the gaseous mixture passing counter-current to the flow of the aqueous suspension. Following this procedure an aqueous solution of aluminum sulphate of fairly high concentration may be withdrawn continuously or discontinuously, with the gaseous mixture passing in contact with fresh aqueous suspension at the last stage of the intimate contact. In this manner the highest efficiency of conversion may be obtained.

Notwithstanding the definition of the aluminum-containing material as one which is soluble in dilute sulphuric acid and the definition of the catalyst in terms of its suitability for the production of sulphuric acid from sulphur dioxide, oxygen, and water, the specific conditions under which my process is operated are such that at no stage in the process does the aqueous suspension contain more than a trace of free sulphuric acid. Obviously the operation of my process does not entail the requirement for use of materials of construction which have to be resistant to the corrosion of sulphuric acid solutions, containing 20 to 30% by weight of $H_2SO_4$ as is characteristic of other processes for the production of aluminum sulphate from similar raw materials.

The crude aluminum sulphate solution produced is treated to separate insoluble and unreacted impurities. The solution so partially purified may be used directly, for such purposes as water purification, or may be further treated for the recovery of aluminum sulphate from the solution or the production of other aluminum compounds. For example, the solution may be concentrated and the aluminum sulphate crystallized and separated therefrom. The aluminum sulphate so produced may be heated to produce aluminum oxide and a gaseous mixture containing sulphur dioxide. Such a gaseous mixture is then suitable for subsequent use in the production of additional aluminum sulphate according to my process.

It will be seen, therefore, that this invention actually may be carried out by the use of various modifications and changes without departing from its spirit and scope, with only such limitations placed thereon as are imposed by the prior art.

I claim:

1. Process of making aluminum sulphate from clay, which is essentially aluminum silicate, which comprises, making an aqueous suspension of the finely divided clay in water containing manganese sulphate catalyst in an amount suitable for the formation of sulphuric acid from sulphur dioxide, oxygen and water; passing a stream of gas containing sulphur dioxide and oxygen in intimate contact with the aqueous suspension of the clay and counter current to the flow of the aqueous suspension of the clay in an enclosed gas absorbing zone at substantially atmospheric pressure; and withdrawing from the enclosed absorbing zone an aqueous solution containing aluminum sulphate in amount up to approximately 30% by weight.

2. Process of making aluminum sulphate from bauxite, which comprises, making an aqueous suspension of the finely divided bauxite in water containing manganese sulphate catalyst in an amount suitable for the formation of sulphuric acid from sulphur dioxide, oxygen and water; passing a stream of gas containing sulphur dioxide and oxygen in intimate contact with the aqueous suspension of the bauxite and countercurrent to the flow of the aqueous suspension of the bauxite in an enclosed gas absorbing zone at substantially atmospheric pressure; and withdrawing from the enclosed absorbing zone an aqueous solution containing aluminum sulphate in amount up to approximately 30% by weight.

3. Process of making aluminum sulphate from alunite, which comprises, making an aqueous suspension of the finely divided alunite in water containing manganese sulphate catalyst in an amount suitable for the formation of sulphuric acid from sulphur dioxide, oxygen and water; passing a stream of gas containing sulphur dioxide and oxygen in intimate contact with the aqueous suspension of the alunite and countercurrent to the flow of the aqueous suspension of the alunite in an enclosed gas absorbing zone at substantially atmospheric pressure; and withdrawing from the enclosed absorbing zone an aqueous solution containing aluminum sulphate in amount up to approximately 30% by weight.

4. Process of making aluminum sulphate from a natural aluminum containing material, reactive with dilute sulphuric acid to form aluminum sulphate, which comprises, making an aqueous suspension of the finely divided aluminum containing material in water containing a soluble manganese catalyst in an amount suitable for the formation of sulphuric acid from sulphur dioxide, oxygen and water; passing a stream of gas containing sulphur dioxide and oxygen in intimate contact with the aqueous suspension of the aluminum containing material and countercurrent to the flow of the aqueous suspension of the aluminum containing material in an enclosed gas absorbing zone at substantially atmospheric pressure; and withdrawing from the enclosed absorbing zone an aqueous solution containing aluminum sulphate in amount up to approximately 30% by weight.

5. Process of making aluminum sulphate from a natural aluminum containing material, reactive with dilute sulphuric acid to form aluminum sulphate, which comprises, making an aqueous suspension of the finely divided aluminum containing material in water containing a small quantity of a soluble compound as a catalyst which will cause the formation of sulphuric acid from sulphur dioxide, oxygen and water in aqueous solution; passing a stream of gas containing sulphur dioxide and oxygen in intimate contact with the aqueous suspension of the aluminum containing material and countercurrent to the flow of the aqueous suspension of the aluminum containing material in an enclosed gas absorbing zone; and withdrawing from the enclosed absorbing zone an aqueous solution containing aluminum sulphate in amount up to approximately 30% by weight.

6. Process of making aluminum sulphate from clay, which is essentially aluminum silicate, which comprises, making an aqueous suspension of the finely divided clay in water containing manganese sulphate catalyst in an amount suitable for the formation of sulphuric acid from sulphur dioxide, oxygen and water; and passing a stream of gas containing sulphur dioxide and oxygen in intimate contact with the aqueous suspension of the clay at substantially atmospheric pressure until a substantial proportion of the aluminum in the clay has been converted into aluminum sulphate.

7. Process of making aluminum sulphate from bauxite, which comprises, making an aqueous suspension of the finely divided bauxite in water containing manganese sulphate catalyst in an amount suitable for the formation of sulphuric acid from sulphur dioxide, oxygen and water; and passing a stream of gas containing sulphur dioxide and oxygen in intimate contact with the aqueous suspension of the bauxite at substantially atmospheric pressure until a substantial proportion of the aluminum in the clay has been converted into aluminum sulphate.

8. Process of making aluminum sulphate from alunite, which comprises, making an aqueous suspension of the finely divided alunite in water containing manganese sulphate catalyst in an amount suitable for the formation of sulphuric acid from sulphur dioxide, oxygen and water; and passing a stream of gas containing sulphur dioxide and oxygen in intimate contact with the aqueous suspension of the alunite at substantially atmospheric pressure until a substantial proportion of the aluminum in the clay has been converted into aluminum sulphate.

9. Process of making aluminum sulphate from a natural aluminum containing material, reactive with dilute sulphuric acid to form aluminum sulphate, which comprises, making an aqueous suspension of the finely divided aluminum containing material in water containing a soluble manganese catalyst in an amount suitable for the formation of sulphuric acid from sulphur dioxide, oxygen and water; and passing a stream of gas containing sulphur dioxide and oxygen in intimate contact with the aqueous suspension of the aluminum containing material at substantially atmospheric pressure until a substantial proportion of the aluminum in the clay has been converted into aluminum sulphate.

10. Process of making aluminum sulphate from a natural aluminum containing material, reactive with dilute sulphuric acid to form aluminum sulphate, which comprises, making an aqueous suspension of the finely divided aluminum containing material in water containing a small quantity of a soluble compound as a catalyst which will cause the formation of sulphuric acid from sulphur dioxide, oxygen and water in aqueous solution; and passing a stream of gas containing sulphur dioxide and oxygen in intimate contact with the aqueous suspension of material at substantially atmospheric temperature.

JOHN H. WALTHALL.